United States Patent [19]

Tsuchida et al.

[11] Patent Number: 4,664,233
[45] Date of Patent: May 12, 1987

[54] ANTILOCK BRAKE DEVICE FOR VEHICLES

[75] Inventors: Tetsuo Tsuchida; Takeshi Kawaguchi, both of Saitama; Tsutomu Hayashi, Tokyo; Yoshinori Yamanoi, Saitama, all of Japan

[73] Assignee: Honda Giken Kogyo Kabushiki Kaisha, Tokyo, Japan

[21] Appl. No.: 780,372

[22] Filed: Sep. 26, 1985

[30] Foreign Application Priority Data

Sep. 27, 1984 [JP] Japan ................................ 59-202563
Feb. 7, 1985 [JP] Japan ................................ 60-22389
Aug. 19, 1985 [JP] Japan ................................ 60-181253

[51] Int. Cl.$^4$ ................................................ B60T 8/02
[52] U.S. Cl. ............................... 188/181 A; 188/2 A; 188/18 A; 188/181 T; 188/344; 303/115; 303/116
[58] Field of Search ................... 303/112–119, 303/99, 2–3, 91, 93, 61–63, 68–69, DIGS. 1–4; 188/181 A, 181 R, 2 A, 344, 18, 17, 181 T

[56] References Cited

U.S. PATENT DOCUMENTS

| Re. 31,387 | 9/1983 | Bayliss ................................ 303/115 |
| 2,818,244 | 12/1957 | Ropar ................................ 264/1 |
| 2,920,924 | 1/1960 | Reswick et al. ........................ 303/24 |
| 3,046,060 | 7/1962 | Stager et al. .......................... 303/21 |
| 3,403,761 | 10/1968 | Rockwell ............................. 188/265 |
| 3,667,816 | 6/1972 | Harned ............................... 303/21 |

(List continued on next page.)

FOREIGN PATENT DOCUMENTS

| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 2069641A | 8/1981 | United Kingdom . |
| 2069642 | 8/1981 | United Kingdom . |
| 2070166A | 9/1981 | United Kingdom . |
| 2109494A | 6/1983 | United Kingdom . |

OTHER PUBLICATIONS

SAE Technical Series 830484, pp. 1–8, "Performance of Antilock Brakes with Simplified Control Technique", by Makoto Satoh & Shuji Shiraishi, 1983.
SAE Section 5: Technical Sessions, pp. 903–909, "Performance of a Simplified Control Technique for Antilock Brakes", by Makoto Satoh & Shuji Shiraishi, 1983.

Primary Examiner—Douglas C. Butler
Attorney, Agent, or Firm—Lyon & Lyon

[57] ABSTRACT

An antilock brake device for vehicles having a sensor which senses a possibility of locking of a wheel, during braking of the wheel, by an overruning of a flywheel which generates a release signal. A hydraulic pump having a cam shaft rotated in association with the wheel generates hydraulic pressure for antilock control. A gear unit as a transmission for transmitting rotation of the wheel at an increased speed to the flywheel comprises an input member located within and connected to a hub of the wheel, a ring gear formed on the input member, a planetary gear meshed with the ring gear and a sun gear meshed with the planetary gear. The planetary gear is secured to a cam shaft supported on a stationary casing. The flywheel of the sensor disposed within the hub is connected to the gear unit through a drive shaft. The sensor is supported on an axle extending through the hub. The casing encasing therein the antilock controller is disposed at an open mouth of a hub recess, and the input member is provided so as to encircle the sensor. A transmission torque limiter is provided between the wheel and the sensor. The input member is connected to the hub by bolts extending through a hub wall from the side thereof opposite the side where the recess is positioned. One side wall of the casing is supported on one axial end of a cylinder shaft fitted on the axle, and the input member is rotatably supported on the other axial end of the cylindrical shaft. A coupling which assumes a connecting state when the shaft is fitted on the axle is provided between the input member and the wheel.

40 Claims, 13 Drawing Figures

U.S. PATENT DOCUMENTS

| | | | |
|---|---|---|---|
| 3,731,767 | 5/1973 | Lefort | 188/72.2 |
| 3,829,166 | 8/1974 | von Loewis of Menar et al. | 303/21 CG |
| 4,036,331 | 7/1977 | Hayashi et al. | 188/187 |
| 4,046,427 | 9/1977 | Baynes et al. | 303/115 |
| 4,260,170 | 4/1981 | Terai et al. | 280/276 |
| 4,260,201 | 4/1981 | Farr | 303/99 |
| 4,281,881 | 8/1981 | Mekosh et al. | 303/99 |
| 4,340,258 | 7/1982 | Farr | 303/115 |
| 4,350,396 | 9/1982 | Mortimer | 303/115 |
| 4,353,440 | 10/1982 | Farr | 188/181 A |
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |
| 4,387,934 | 6/1983 | Farr | 303/116 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,422,695 | 12/1983 | Farr | 303/115 |
| 4,428,624 | 1/1984 | Farr | 303/116 |
| 4,436,348 | 3/1984 | Farr | 303/115 |
| 4,456,309 | 6/1984 | Rath | 303/10 |
| 4,456,310 | 6/1984 | Hayashi et al. | 188/181 R X |
| 4,457,563 | 7/1984 | Farr | 303/92 |
| 4,474,413 | 10/1984 | Farr | 303/116 |
| 4,551,156 | 4/1985 | Offenstadt | 280/276 |
| 4,602,705 | 7/1986 | Farr et al. | 188/181 A |

FIG. I

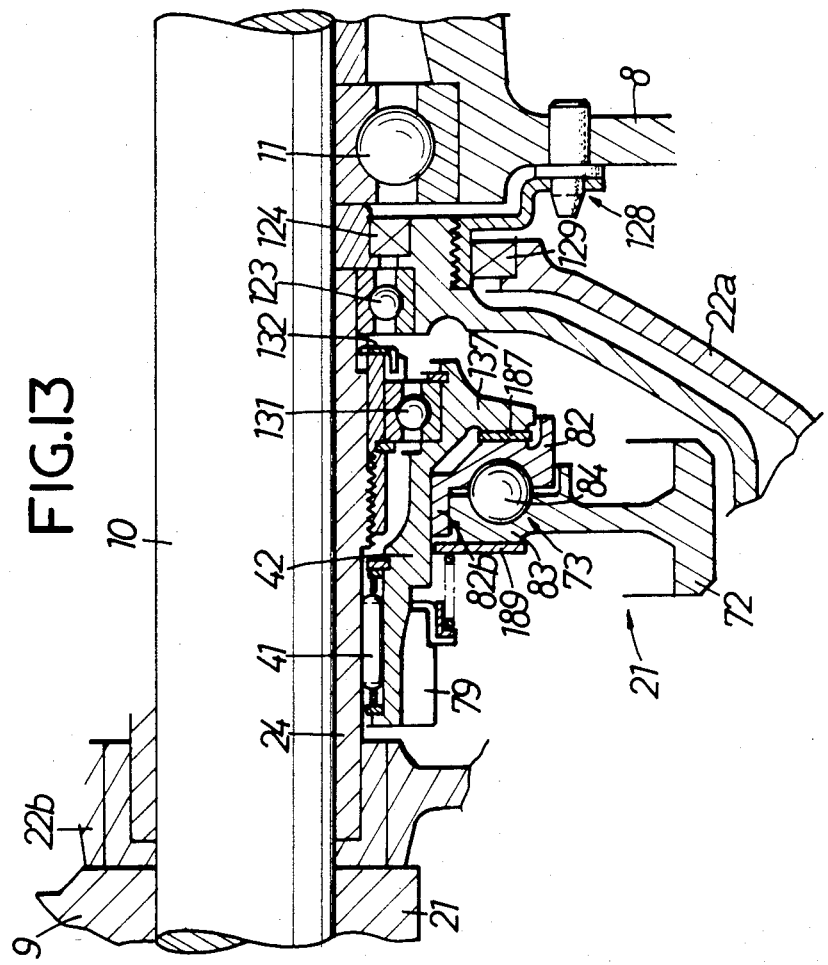

4,664,233

ANTILOCK BRAKE DEVICE FOR VEHICLES

BACKGROUND OF THE INVENTION

The field of the present invention is brake devices for vehicles such as motorcycles and automobiles, and more particularly brake devices provided with an antilock control system.

Antilock brake devices have been developed which include a sensor having a flywheel driven by the vehicle wheel through a transmission to sense the possible onset of wheel lock during braking. The sensor operates by means of an overrunning rotation of the flywheel relative to the vehicle wheel which generates an output signal. Also included is a hydraulic pump driven by the vehicle wheel, also through a transmission. A modulator having a hydraulic control chamber in communication with an output chamber of the hydraulic pump is provided in a hydraulic line between the master cylinder and the wheel brake of the vehicle. This hydraulic control chamber reduces and restores hydraulic pressure to the wheel brake in response to reductions and increases in pressure in the hydraulic control chamber. A normally closed pressure discharge valve is provided in a passage between the hydraulic control chamber and an oil reservoir. The discharge valve is adapted to open upon receipt of an output signal from the sensor. Such a brake device disclosed, for example, in Japanese Patent Application laid-open No. 120,440/1981, in which the whole antilock control device is mounted on a wheel support system for a vehicle externally of the supported wheel.

In the above described device, a substantial amount of room is required externally of the wheel to accommodate the antilock control device. A special support structure is necessary to firmly support the antilock control device on the vehicle. Since the transmission and the sensor are disposed externally of the wheel, various measures have to be specially taken in order to protect them from contamination and injury. In view of the foregoing, such devices exhibit significant disadvantages. Such devices are oversized, complicated, hard to assemble and exhibit instabilities.

SUMMARY OF THE INVENTION

The present invention is directed to an antilock brake device which may be compact, easily assembled and disassembled, structurally stable and relatively uncomplicated.

In a first aspect of the present invention, an antilock brake device having a flywheel deceleration sensor disposed within a wheel hub, a planetary gear train driving said flywheel at velocities greater than the hub and a hydraulic pump associated with a casing which does not rotate with the hub is contemplated. The shaft of the hydraulic pump is coupled with a planetary gear of the planetary gear train.

With the foregoing arrangement, a hollow portion of the wheel hub, which is conventionally dead space, can be effectively utilized for compactly accommodating a flywheel sensor and the gear train to drive same and to protect such mechanisms from injury. In addition, the portion of the antilock brake device which must project from the hollow portion of the wheel hub may be made more compact. Finally, accommodation of both the sensor flywheel and hydraulic pump by the same transmission mechanism results in greater compactness and reduced complication of the overall device.

In a second aspect of the present invention, an antilock brake device having a sensor mechanism supported on an axle extending through the wheel hub is disposed in a recess of the wheel hub. A casing incorporating additional components of the antilock brake device is also supported on the axle at the opening of the recess of the wheel hub. A cup-shaped input member to couple the sensor mechanism with the wheel hub encircles the sensor and has an end wall directly coupled to the hub. Again, a gear train operatively connects the input member to the sensor for driving the sensor.

With the foregoing arrangement, portions of the antilock brake device external to the wheel hub can be minimized to reduce the overall assembly. Through such a mechanism, the axle may be utilized to simplify the support structure of the device and a single transmission mechanism may be employed to drive both a hydraulic pump and a flywheel sensor without interfering with the axle support. This arrangement also allows brake lines to be easily accessible to facilitate maintenance.

In a third aspect of the present invention, an antilock brake device is contemplated which employs a torque limiting device in the operative coupling between the wheel and a flywheel sensor. Thus, slippage of the sensor may be accomplished upon receipt of a rotary torque in excess of a predetermined value. Thus, if an overload tends to be applied to the sensor during the rotation thereof, slippage may occur in the torque limiting device to maintain torque from the wheel of the vehicle to the sensor at a level below a predetermined value.

In a fourth aspect of the present invention, an antilock brake device is contemplated which incorporates an accelerating gear train to drive a flywheel sensor at increased rotation over that of the wheel of the vehicle. An input member in that gear train is fit within a boss projecting from an inner wall of a wheel hub. An axle further supports portions of the gear train as well as the wheel hub. The input member may be bolted from the other side of the hub. Thus, alignment accuracy and stability associated with such a system can improve transmission efficiency of the components and at the same time provide for easy access and removal thereof.

In a fifth aspect of the present invention, an antilock brake device may include a casing incorporating an antilock control device supported on one end of a cylindrical shaft fitted on the axle of the wheel along with the driving input of the wheel hub to the sensing mechanism. In this way, construction can be simplified, the axle itself provides added structural support and the device may be easily assembled as a single assembly separate from the wheel hub for facility of construction and maintenance.

Accordingly, it is an object of the present invention to provide an improved antilock brake device. Further objects and advantages will appear hereinafter.

BRIEF DESCRIPTION OF THE DRAWINGS

The drawings show several embodiments according to the present invention.

FIG. 1 is a schematic plan view of a motorcycle provided with an antilock brake device, FIG. 2 a side elevation in section showing essential parts of the antilock brake device, FIGS. 3 and 4 sectional views taken on lines III—III and IV—IV, respectively, of FIG. 2, FIG. 5 an enlarged sectional view taken on line V—V of FIG. 4, FIG. 6 a circuit diagram of a display circuit in FIG. 2 and FIG. 7 a circuit diagram of a modification of the display circuit.

FIGS. 12 and 13 show fourth and fifth embodiments, respectively, each being a longitudinal sectional view of a part of the antilock brake device.

DESCRIPTION OF THE PREFERRED EMBODIMENTS

Embodiments of the present invention will be described with specific reference to the accompanying drawings in which all identical or corresponding elements of each of the embodiments will be indicated by corresponding numbers.

Figure 1:
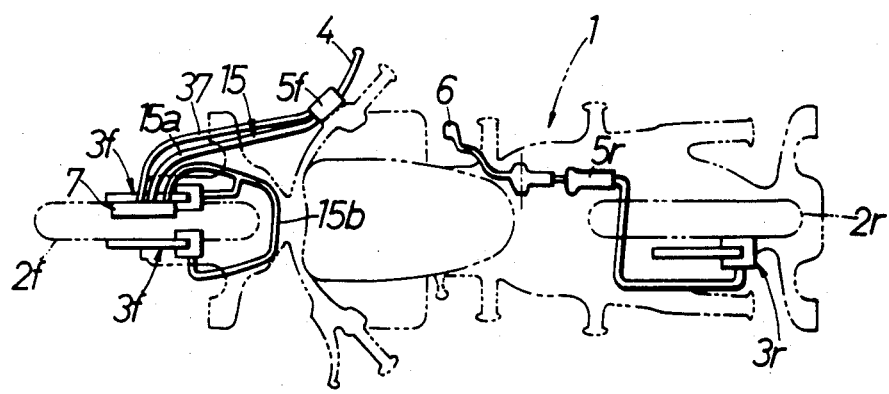
FIGS. 1 to 7 show a first embodiment.

FIGS. 1 to 7 show a first embodiment of the present invention. Turning first to FIG. 1, a motorcycle 1 has a pair of front right and left wheel brakes 3f, 3f for braking a steering front wheel 2f, and a single rear wheel brake 3r for braking a rear wheel 2r of the motorcycle. The front brakes 3f, 3f are operated by the output of hydraulic pressure from a front master cylinder 5f operated by a brake lever 4. The rear brake 2f is operated by the output of hydraulic pressure from a rear master cylinder 5r which is actuated by a brake pedal 6. In this embodiment, the hydraulic pressure to the front brakes 3f, 3f are controlled by an antilock controller 7.

Figure 2:
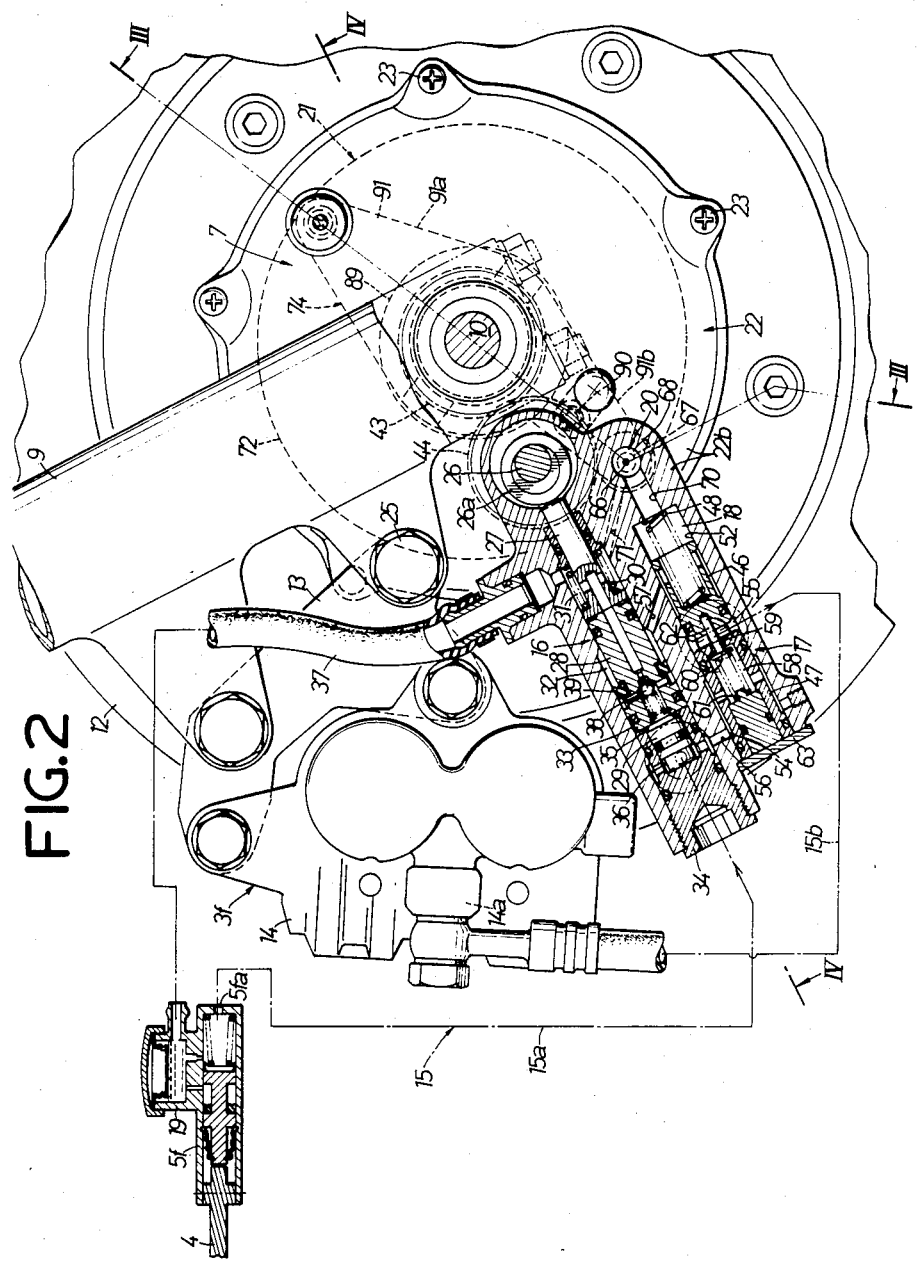
Figure 3:
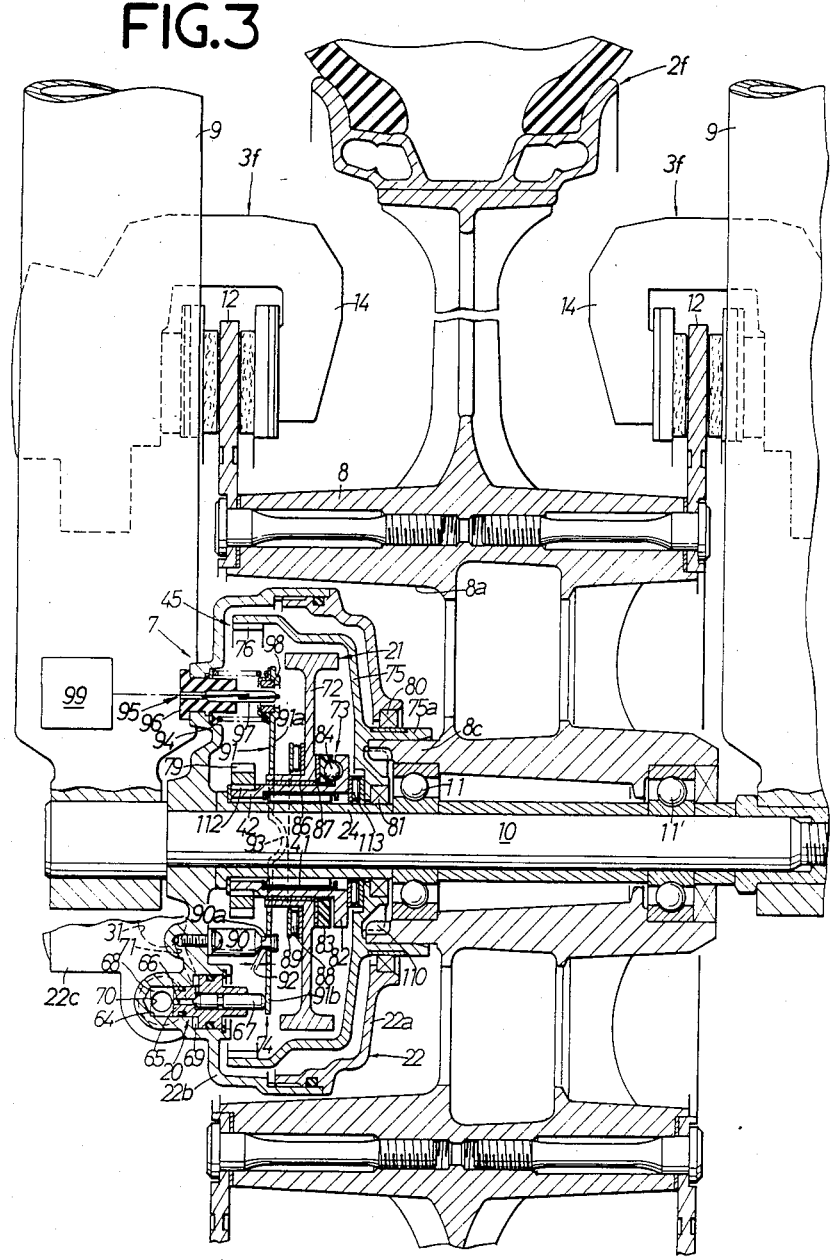

Turning to FIGS. 2 and 3, a hub 8 of the front wheel 2f is supported through two bearings 11, 11' on an axle 10. The axle 10 is secured to the lower ends of a front fork 9. Each of the brakes 3f includes a brake disc 12 securely fixed to the end face of the hub 8 and a brake caliper 14 straddling the disc 12 and supported by a bracket 13 to the front fork 9. The caliper 14 operates to grip the brake disc 12 when the output of hydraulic pressure from the cylinder 5f is supplied to the input port 14a. In this way, a braking force is applied to the wheel 2f.

The antilock controller 7 is functionally interposed in the hydraulic conduit 15 coupled between the output port 5fa of the front master cylinder 5f and the input port 14a of the brake caliper 14.

The antilock controller 7 principally includes within a common casing 22 a hydraulic pump 16 driven by the front wheel 2f, a modulator 17 having a hydraulic control member 18 to receive the discharge pressure of the pump 16 and interposed in the midst of the conduit 15, a normally closed exhaust or discharge pressure valve 20 interposed in a passage between the chamber 18 and a reservoir 19, and an inertia type sensor 21. The sensor 21 detects the onset of wheel lock by angular deceleration of the front wheel 2f above a predetermined value to allow the discharge pressure valve 20 to open.

The casing 22 has a cup-shaped inner casing 22a and an outer casing 22b. The open ends of each are fixed together by screws. A radially outwardly extending portion 22c is integrally formed in the end wall of the outer casing 22b. The casing 22 is arranged in a recess 8a formed in one end of the hub 8 with the portion 22c extending therefrom. In this way, the outer casing 22b is arranged at the mouth of the recess 8a and is supported on the axle 10 extending through the center of the end wall. The outer casing 22b is also connected to the front fork 9 by means of an attachment mechanism so as not to rotate about the axle 10. The attachment mechanism may be of conventional construction as, for example, bolts 25, illustrated in FIG. 2, for clamping a bracket 13 to the front fork 9.

The pump 16 includes a camshaft 26 arranged parallel to the axle 10, a pushrod 27 with its inner end following on an eccentric cam 26a formed on the camshaft 26, a pump piston 28 in contact with the outer end of the pushrod 27, an operating piston 29 in contact with the outer end of the pump piston 28, and a return spring 30 to bias the rod 27 away from the eccentric cam 26a. The pushrod 27 and the pump piston 28 are slidably arranged within a first cylindrical hole 33 formed in the extending portion 22c. An inlet chamber 31 and an outlet chamber 32 are defined within the cylindrical hole 33 around the pushrod 27 and the pump piston 28, respectively. A plug 34 is fitted into the outer end of the first cylinder hole 33 to define a pump chamber 35 at the end of the piston 28. The operating piston 29 is slidably arranged within the plug 34 so as to form a hydraulic chamber 36.

The inlet chamber 31 communicates with the fluid reservoir 19 through a conduit 37. This chamber 31 further communicates through a suction valve 38 with the pump chamber 35. The pump chamber 35 in turn communicates with the outlet chamber 32 through a unidirectional sealing member 39. The sealing member 39 provides a discharge valve function. The hydraulic chamber 36 is connected to the upstream conduit 15a of the conduit 15. The chamber 36 is thus always in communication with the output port 5fa of the cylinder 5f.

Figure 4:
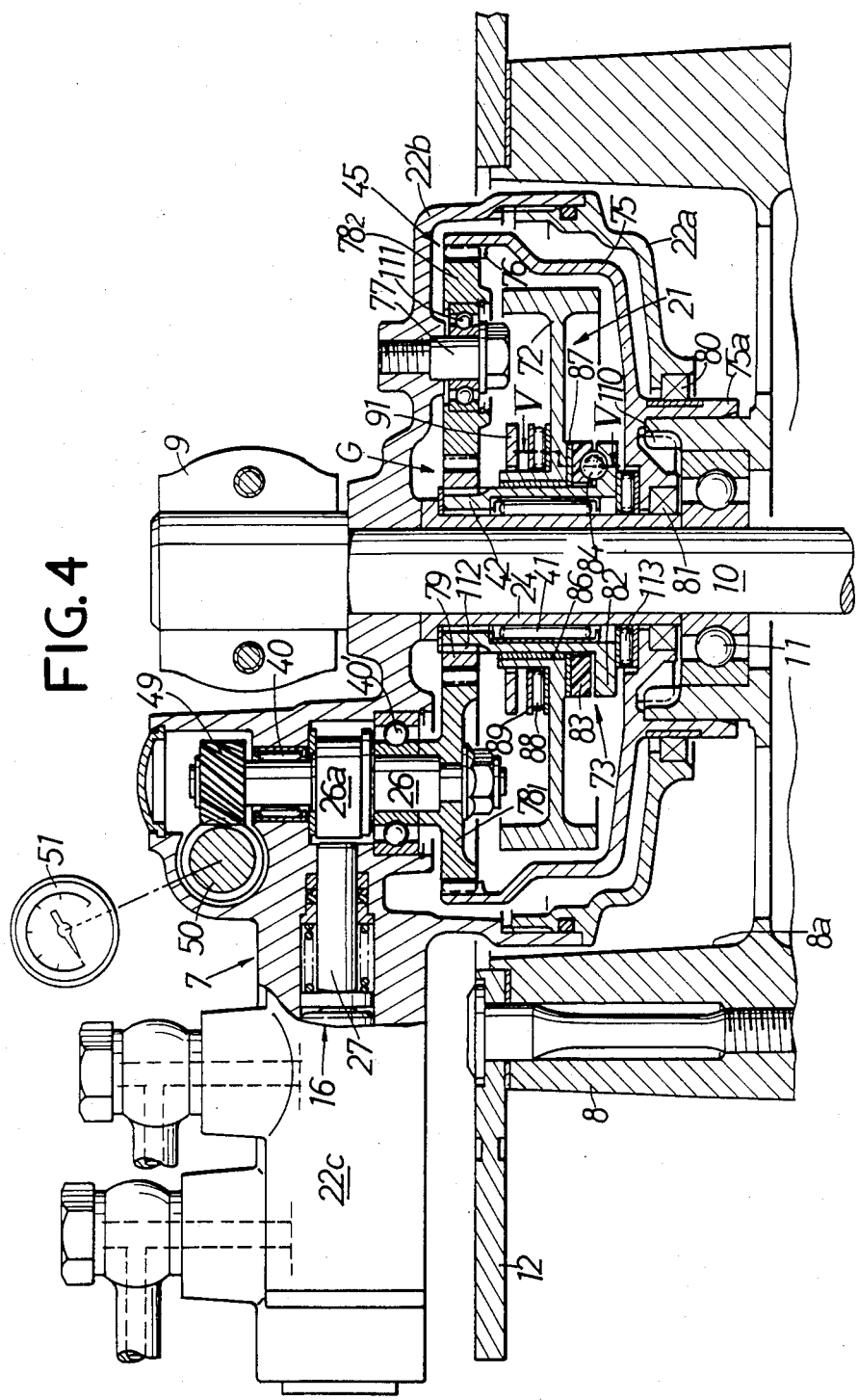

As illustrated in FIG. 4, the camshaft 26 is supported in the outer casing 22b through bearings 40 and 40'. The camshaft 26 is driven through an accelerating gear unit 45, which will be described later, by the front wheel 2f.

A meter drive gear 49 is arranged at the outside end of the camshaft 26. The meter drive gear 49 is engaged with a driven gear 50 which is in turn connected to the input shaft of a speedometer 51 of the motorcycle.

The modulator 17 includes a pressure reducing piston 46, a stationary piston 47 abutting one end of the pressure reducing piston 46 to restrict the backward movement thereof, and a return spring 48 for biasing the piston 46 into contact with the piston 47. Both the pressure reducing piston 46 and the stationary piston 47 are slidably disposed within a second cylindrical hole 52 which is formed substantially parallel to and adjacent the first cylindrical hole 33 in the extending portion 22b.

The piston 46 and the hole 52 define the control hydraulic chamber 18 at one end of the hole 52. Additionally, an output hydraulic chamber 55 is defined within the hole 52 against the piston 47. Around the outer periphery of the piston 47 within the hole 52, an input hydraulic chamber 54 is arranged which communicates with the chamber 36 of the pump 16 through an oil passage 56. The output hydraulic chamber 55 is in communication with the downstream conduit 15b of the conduit 15. The conduit 15b is in communication with the input ports 14a of the brakes 3f, 3f. The control hydraulic chamber 18 communicates with the outlet chamber 32 of the pump 16 through an oil passage 57.

The piston 47 includes a valve chamber 58 which is always in communication with the input hydraulic chamber 54, and a valve port 59 for communication between the valve chamber 58 and the output hydraulic chamber 55. The valve chamber 58 encases therein a valve body 60 to open and close the valve port 59 and a valve spring 61 which biases the valve body to the closed position at the port 59. A valve opening rod 62 controlling the valve body 60 extends from one end of the pressure reducing piston 46 and maintains the valve body 60 in the open state when the piston 46 is disposed at its retracted limit within the hole 52.

The outer end of the second cylindrical hole 52 is closed by an end plate 63 fixed to the extending portion 22c. The piston 47 always extends into contact with the end plate 63 by the resilient force of the spring 48 or by the hydraulic pressure introduced into the chambers 54 and 55.

The pump 16 and the modulator 17 are disposed on the back side of the front fork 9 in a similar arrangement to that of the caliper 14.

The exhaust pressure valve 20 includes a valve seat member 65 which is engaged within a stepped cylindrical hole 64 of the outer casing 22b and a valve body 67 slidably arranged within the member 65 to control a valve port 66. The member 65 defines an inlet chamber 68 in the reduced diameter portion of the stepped cylindrical hole 64 and an outlet chamber 69 in the enlarged diameter portion of the stepped cylindrical hole 64. The chambers 68 and 69 communicate through the port 66. The chamber 68 communicates with the chamber 18 of the modulator 17 through an oil passage 70. The chamber 69 communicates with the chamber 31 of the pump 16 through an oil passage 71. Therefore, eventually the chamber 69 communicates with the reservoir 19.

The sensor 21 includes a flywheel 72 situated through the accelerating gear unit 45 as a transmission and a drive shaft 42, a cam mechanism 73 for transmitting rotation of the drive shaft 42 to the flywheel 72 and converting the overrunning rotation of the flywheel 72 into an axial displacement, and an output lever mechanism 74 which controls operation of the valve 20 in response to the axial displacement of the flywheel 72. The cam mechanism 73, flywheel 72 and lever mechanism 74 are disposed within the casing 22.

The gear unit 45 includes a cup-shaped input member 75 which is disposed within the casing 22 with its open end directed toward the outer casing 22b and which is connected to a boss 8c extended from the center on the left side of the hub 8 of the front wheel 2f through a rugged or concave-convex engaging portion 110, a ring gear 76 formed on the open end of the input member 75, a first planetary gear $78_1$, fixed to the inner end of the camshaft 26 and engaged with the ring gear 26, a second planetary gear $78_2$ supported through a bearing 111 on a shaft 77 extended from the end wall of the outer casing 22b and engaged with the ring gear 76, and a sun gear 79 simultaneously engaged with the first and second planetary gears $78_1$ and $78_2$. The drive shaft 42 is spline-connected at 112 to the sun gear 79. The drive shaft 42 is supported through a needle bearing 41 on the shaft 24 fitted on the axle 10 and secured thereon. The drive shaft 42 is also connected to the hub 8 through the gear unit 45.

The ring gear 76, first and second planetary gears $78_1$, $78_2$ and sun gear 79 in the gear unit 45 constitute a gear train G. The second planetary gear $78_2$ places the engagement between the first planetary gear $78_1$ and the ring gear 76 and the sun gear 79 in normal condition to maintain the concentric relation between the ring gear 76 and the sun gear 79 to provide the positive transmission operation of the gear unit 45. Where the supporting rigidity of the ring gear 76 and the sun gear 79 is high, the second planetary gear $78_2$ can be omitted.

The input member 75 is integrally provided with a short cylindrical portion 75a extending from the outer surface of the end wall thereof. The portion 75a extends through the end wall of the inner casing 22a and is fitted into one axial end, or boss 8c, of the hub 8 to control the connection attitude of the input member 75 with respect to the hub 8. To seal the interior of the casing 22, sealing members 80 and 81 are interposed between the cylindrical portion 75a and the end wall of the inner casing 22a and between the end wall of the input member 75 and the shaft 24, respectively.

Figure 5:
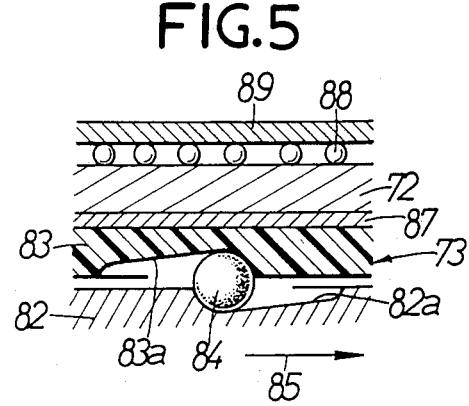

The cam mechanism 73, as illustrated in FIG. 5, includes a drive cam plate 82 which is secured to the end of the drive shaft 42 on the side of the input member 75, a driven cam plate 83 rotatably arranged opposite to the plate 82 on the drive shaft 42, and a thrust ball 84 engaged in the cam recesses 82a and 83a formed on the opposing surfaces of the plates 82 and 83. The recess 82a of the drive cam plate 82 is inclined such that its depth decreases toward the direction of rotation of the shaft 42 as noted by the arrow 85. The recess 83a of the cam plate 83 is inclined so that the recess becomes deeper toward the direction of rotation as indicated by the arrow 85. Consequently, until actuating conditions are sensed, the cam plate 82 is generally arranged relative to the cam plate 83 such that the ball 84 within the recesses 82a and 83a are located in the deepest portions of both recesses. In this position, rotary torque received from the drive shaft 42 by the cam plate 82 is transmitted to the cam plate 83. Under these conditions, no relative rotation occurs between the cam plates 82 and 83. When the cam plate 83 is overrun relative to the cam plate 82, relative rotation occurs between the cam plates. As a result, the thrust ball 84 rolls within each recess to a shallower position and the plates 82 and 83 are axially displaced. The drive cam plate 82 is supported on the end wall of the input member 75 through a thrust bearing 113 so as not to produce the axial displacement.

In order to avoid an impact resulting when the ball 84 abruptly reaches the rolling limit within the recesses 82a and 83a, at least one component of the cam mechanism 73 is formed of a synthetic resin material. In the preferred embodiment, the cam plate 83 and the ball 84 are formed of synthetic resin. This can prevent the cam mechanism 73 from vibrating due to such impact forces and durability is improved.

The flywheel 72 is rotatably and slidably supported through a bushing 86 on the drive shaft 42 in the cup-shaped input member 75 and is engaged with one side of the cam plate 83 through a friction clutch plate 87. A pressure plate 89 is provided through a thrust bearing 88 on the other side of the flywheel 72.

The output lever mechanism 74 includes a supporting shaft 90 which projects from the inner surface of the outer casing 22b at an intermediate position between the axle 10 and the valve 20, and a lever 91 loosely supported in the axial direction of the axle 10 at a neck 90a at the end of the shaft 90. A predetermined clearance or play 92 is provided in the axial direction between the neck 90a and the lever 91. The lever 91 is composed of a long first arm 91a which extends around the shaft 42 from the supporting shaft 90 and a short second arm 91b which extends from the shaft 90 toward the valve 20. Midway on the arm 91a, a portion thereof is raised to define an abutment portion 93 which abuts against the outside surface of the plate 89.

A spring 94 is interposed in a compressed state between the end of the arm 91a and the outer casing 22b. The arm 91b, as a consequence of this arrangement, is held against the outer end of the valve body 67 of the valve 20.

The resilient force of the spring 94 acts on the lever 91 to press the abutment portion 93 of the arm 91a against the plate 89 which in turn presses the arm 91b against the valve body 67 of the valve 20 to hold the valve body 67 in a closed state. The resulting force of the spring 94 acting through the lever 91 is also applied to the flywheel 72, the clutch plate 87 and the cam plate 83 through the plate 89 with a predetermined frictional engagement force. This force acts to press the plates 82 and 83 toward one another.

The frictional engaging force is set such that the clutch plate slips when rotary torque between the cam plate 83 and the flywheel 72 exceeds a predetermined level.

A detector 95 for detecting the normal operation of the lever mechanism 74 is connected to the lever mechanism 74. The detector 95 comprises a switch holder 96 secured to the outer casing 22b and protruding into the center of the coil of the spring 94, a lead switch 97 held by the holder 96 in the coil of the spring 94, and a permanent magnet 98 attached to the first arm 91a adjacent the switch 97. When the arm 91a is rocked by a predetermined angle relative to the outer casing 22b, the permanent magnet 98 is displaced to close the position of the switch 97.

Figure 6:
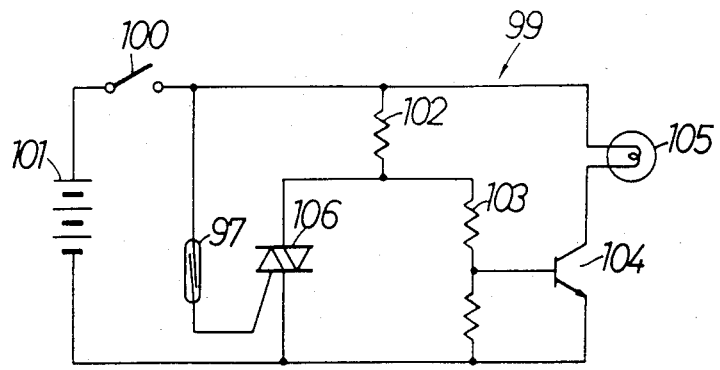

A display circuit 99 is connected to the lead switch 97. The display circuit 99 is constructed as shown in FIG. 6. When a main switch 100 is closed, a current flows from a power source 101 through the main switch 100, and resistors 102 and 103 to the base of a transistor 104. Thus, the transistor 104 conducts with the result that a display lamp 105 is energized through the switch 100 to the ON position. When the switch 97 is temporarily closed by the approach of the magnet 98 under this condition, a current flows to the gate of a thyristor 106 through the switch 97. Thus, the thyristor 106 conducts, the current fed through the resistor 102 flows to the thyristor 106 and the transistor 104 is interrupted. In this way, the lamp 105 is turned OFF. Therefore, the rocking motion of the lever 91 relative to the cover 22b against the elastic force of the spring 94 can be indicated by the lamp 105 turning off. Even if the switch 97 is then opened by the reset of the lever 91, the OFF state of the lamp 105 is held by the thyristor 106 until the main switch 100 is opened and again closed.

The main switch 100 may be an ignition switch or brake switch of the motorcycle.

Figure 7:
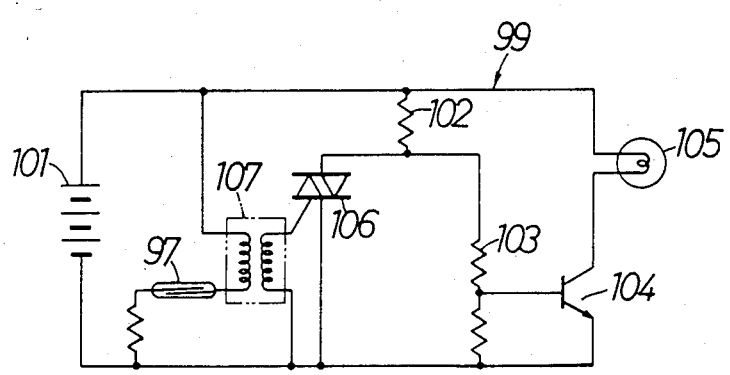

As shown in FIG. 7, an induction coil 107 may be used instead of the switch 100. More specifically, the primary side of the coil 107 may be connected to the switch 97 and the secondary side may be connected to the gate of the thyristor 106. This second construction is similar to that shown in FIG. 6 and the corresponding components are designated by the same reference numbers as those in FIG. 6. In the construction, when the switch 97 is open or closed, positive and negative pulses are alternatively generated at the secondary side of the coil 107, thereby repeating the conduction and interruption states of the thyristor 106. Thus, the lamp 105 is caused to flash. By this means, the operation of the lever 91 can be confirmed by the flashing of the lamp 105.

Next, operation of this embodiment will be described

When the vehicle is running, rotation of the front wheel 2f is transmitted from the hub 8 to the input member 75 through the engaging portion 110, and transmitted to the drive shaft 42 while being increased in speed by the ring gear 76, the first and second planetary gears $78_1$, $78_2$ and the sun gear 79. The flywheel 72 is then driven through the cam mechanism 73 and the friction clutch plate 87. Thus, the flywheel 72 is rotated at a speed faster than the wheel 2f. This provides additional rotary inertia to the flywheel 72.

At the same time, the cam shaft 26 and the speedometer 51 are driven by the first planetary gear $78_1$.

When the master cylinder 5f is operated to brake the wheel 2f, the hydraulic pressure output is transmitted sequentially through the upstream conduit 15a of the conduit 15, the chamber 36 of the pump 16, the chamber 54 of the modulator 17, the chamber 58, the valve port 59, the chamber 55 and the downstream conduit 15b of the conduit 15 to the front brakes 3f. Braking force is thus applied to the wheel 2f.

In the pump 16, the output hydraulic pressure of the master cylinder 5f is introduced to the chamber 36. Thus, the pump piston 28 is reciprocated by the action of the hydraulic pressure on the piston 29 and the lifting action of the pushrod 27 responsive to the cam surface 26a. During the suction stroke of the piston 28 when the piston moves toward the pushrod 27, the valve 38 is opened and the oil from the reservoir 19 is sucked through the conduit 37 and the chamber 31 to the chamber 35. During the discharge stroke of the piston 28 with the piston 28 moving toward the operating piston 29, the sealing member 39 opens to feed the hydraulic fluid in the chamber 35 to the chamber 32 and further through the oil passage 57 to the chamber 18 of the modulator 17. When the pressures of the chambers 32 and 18 rise to a predetermined level, the piston 28 is held in contact with the plug 34 by the pressure of the chamber 32.

Since the communication between the chamber 18 of the modulator 17 and the reservoir 19 is initially interrupted by the closing of the valve 20, the hydraulic pressure supplied to the chamber 18 from the pump 16 acts directly on the piston 46 to press the piston 46 to its retracted position. Thus, the valve body 60 is held in the valve open state by the rod 62. This allows the output hydraulic pressure of the cylinder 5f to pass therethrough. Thus, the brake force applied to the brakes 3f becomes proportional to the hydraulic pressure of the cylinder 5f at the initial stage of braking.

When an angular deceleration is generated by the wheel 2f in response to the braking, the flywheel 72 senses the deceleration and tends to overrun the drive shaft 42 by the stored inertial force in the flywheel 72. The relative movement of the flywheel 72 under this condition produces relative rotation between the cam plates 82 and 83 to axially displace the flywheel 72 by the thrust generated by the rolling of the ball 84. In turn, the plate 89 is forced axially to push the lever 91.

The behavior of the lever 91 when pressed by the plate 89 will be discussed. The motion of the lever 91 in response to movement of the plate 89 first acts to overcome the play 92 between the shaft 90 and lever 91. If the axial motion continues, the lever 91 is pressed by the plate 89 to rock about the valve body 67 serving as a fulcrum. When the rocking motion of the lever 91 advances to a predetermined degree, the play 92 between the shaft 90 and the lever 91 is eliminated and the fulcrum of the lever moves from the valve body 67 to the shaft 90 which is closer to the advancing plate 89. The lever 91 then rocks about the shaft 90.

When the lever 91 is rocked by the plate 89, the lever ratio varies in two stages. Even if the repulsion of the spring 94 is constant, the lever 91 rocks by the relatively small force of the plate in the first stage, and once the fulcrum has moved, the lever does not further rock until the axial force of the plate reaches a predetermined value. When reached, such braking pressure is generated as resulting in a small angular deceleration of the wheel 2f. This motion of the lever 91 acts to bring the permanent magnet 98 toward the closed position with the switch 37. The display circuit 99 is operated as described above by this motion of the permanent magnet 98 to notify the driver that the sensor 21 is operating normally.

When the wheel 2f is about to lock due to excessive brake force or a decrease in the frictional coefficient of the road surface, the force of the plate 89 exceeds a predetermined value. This results from the abrupt increase in the angular deceleration of the wheel 2f beyond that of normal braking. As a result, the lever 91 rocks further about the shaft as a fulcrum to compress the spring 94. The arm 91b of the lever 91 rocks to separate the valve body 67 at the same time that the spring 94 is being compressed. Consequently, valve 20 is opened.

When the valve 20 opens, the hydraulic pressure in the chamber 18 is exhausted through the passage 70, the chamber 68, the port 66, the chamber 69, the passage 71, the chamber 31 of the pump 16 and the conduit 37 to the reservoir 19. Consequently, the piston 46 is returned by the hydraulic pressure of the chamber 55 toward the chamber 18 against the tension of the spring 48. As a result, the rod 62 is retracted to close the valve body 60. The valve body 60 then interrupts the communication between the chambers 54 and 55 and increases the volume of the chamber 55. The brake hydraulic pressure acting on the brake 3f then decreases to reduce the brake force of the wheel 2f. The reduction in the brake force results in the avoidance of locking. With reduction in the braking force, the wheel 2f is again accelerated. The pressing force of the plate 89 against the lever 91 decreases and the lever 91 rocks toward the at-rest position by the force of the spring 94. Consequently, valve 20 is able to close. When valve 20 closes, the hydraulic oil discharged from the pump 16 is immediately sealed in the chamber 18. The piston 46 then retracts toward the chamber 55 to raise the hydraulic pressure in the chamber 55. This again increases brake force. This operation is repeated at high speed and the wheel 2f is efficiently braked.

In the brake device thus constructed, the sensor 21 of the antilock controller 7 and the gear unit 45 are arranged in the recess 8a of the hub 8 which would otherwise be a wasted space, to make very few externally projecting parts of the controller 7 outside the wheel 2f. The hub 8 of the wheel 2f serves as a protective wall against external disturbance to prevent the gear unit 45 and the sensor 21 from being affected.

In addition, since the outer casing 22b incorporating the pump 16, the modulator 17, and the valve 20 and the sensor 21 are supported on the axle 10, the axle 10 serves as the supporting member to simplify the supporting construction of the outer casing 22b and the sensor 21.

Moreover, the gear unit 45 is constructed such that the cup-shaped input member 75 connected to the hub 8 and surrounding sensor 21 is connected to the cam shaft of the hydraulic pump 16 and to the drive shaft 42 of the sensor 21 through the gear train G located between the outer casing 22b having the hydraulic pump 16 and the sensor 21. Thus, the hydraulic pump and the sensor 21 can be driven from the hub 8 at speeds suitable for their function through the single gear unit 45 without being hampered by the axle 10.

Furthermore, since the hydraulic pump 16, the modulator 17 and the exhaust pressure valve 20 are incorporated in the outer casing 22b disposed at the opening of the recess 8a of the hub 8, piping for connecting these elements to the front master cylinder 5f, the front wheel brakes 3f and the oil reservoir 19 is very easily accomplished.

Since the input member 75 of the gear unit 45 is formed into a cup-shape so as to cover the sensor 21, the input member 75 along with the hub 8 serves as a protective wall against the external disturbance to delete the effect of the external disturbance on the sensor 21. More specifically, particularly as clearly shown in FIG. 4, the first and second planetary gears $78_1$, $78_2$ are meshed with the ring gear 76 at the open end of the cup-shaped input member 75, the sun gear 79 on the axle 10 is meshed with these planetary gears $78_1$, $78_2$, and the sun gear 79 is connected to the input portion of the sensor 21 through the drive shaft 42. The drive shaft 42 is roratably supported on the axle 10 and extends toward the inner end wall of the cup-shaped input member 75. Thus, the sensor 21 can be easily disposed within the input member 75. With this arrangement, a cover exclusively used for the sensor 21 need not be provided to further simplify the construction. It should be noted that the gear train G of the gear unit 45 is arranged approximately on the same plane extending vertical to the axle 10, serving to restrict its axial occupying space to a minimum level.

Moreover, the input member 75 is supported on the boss 8c at the center of the hub 8, the drive shaft 42 is supported on the axle 10 through the shaft 24, and the flywheel 72 is supported on the drive shaft 42 through the bushing 86. Therefore, the three elements, the input member 75, the drive shaft 42 and the flywheel 72, can be installed accurately on the same axis as the wheel 2f.

Figure 8:
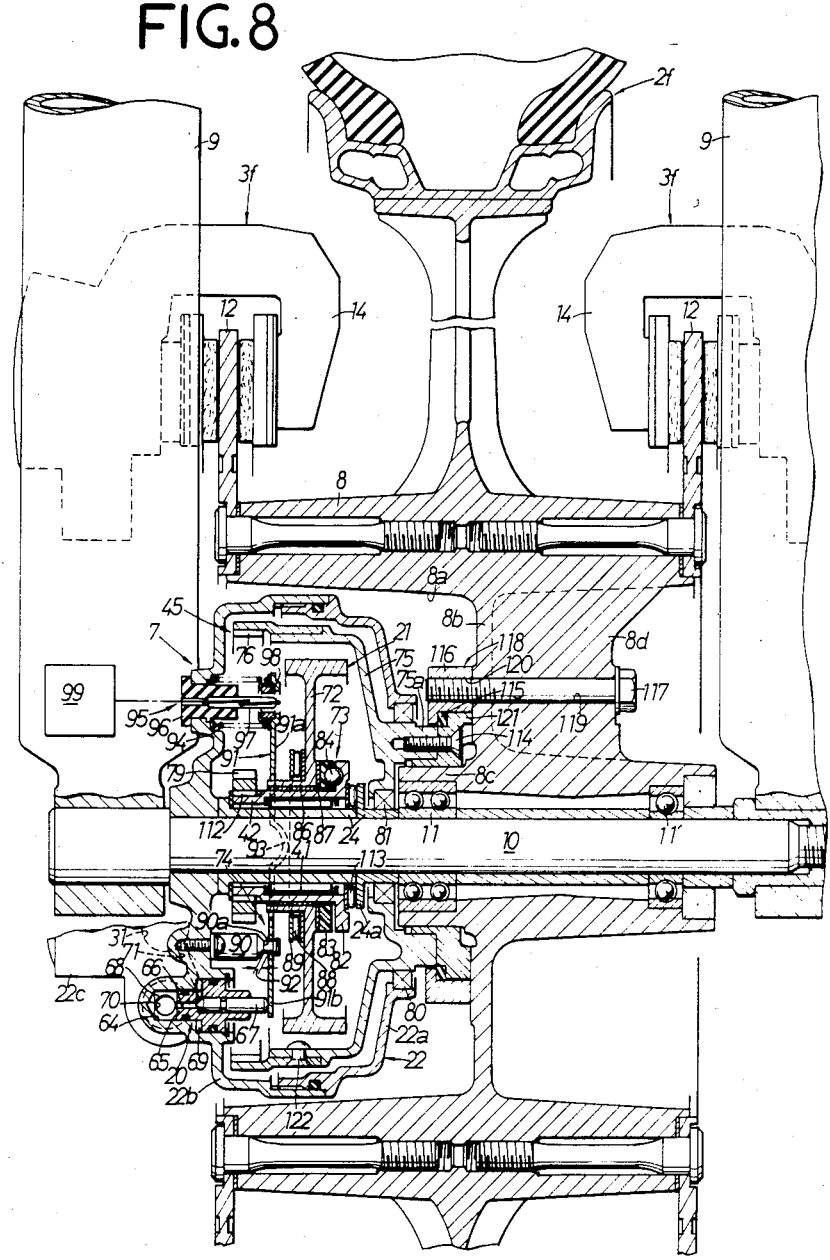
FIG. 8 is a sectional view showing essential parts similar to FIG. 3, of a second embodiment.

FIG. 8 shows a second embodiment of the present invention and is a sectional view showing essential parts similar to FIG. 3. In this embodiment, the ring gear 76 of the gear unit 45 is securely fixed by rivet 122 to the open end of the input member 75. This fixing means is not limited to rivet but may be caulking, screwing, casting or other suitable means.

The input member 75 is formed of a lightweight material, for example, such as aluminum alloy, and the ring gear 76 is formed of a high strength material, for example, such as steel. This provides a lightweight gear unit 45 of high durability.

While in this embodiment the shaft 24 is axially divided into two sections, it is noted that these sections can be integrally formed together similar to the first embodiment. The drive cam plate 82 of the cam mechanism 73 is supported through the thrust bearing 113 on a flange 24a formed integral with one of the two sections of the shaft 24.

The cylindrical portion 75a projecting from the outer surface of the end wall of the input member 75 has a connecting flange 121 secured by means of a screw 114 to the end face thereof.

The connecting flange 121 is rotatably fitted on the boss 8c projecting leftward, namely, into the recess 8a from the central portion of axially left side surface of the vertical partition wall 8b which is disposed centrally on the hub 8. The connecting flange 121 is also clamped and held between the wall 8b and a connecting ring 116 through a resilient frictional member 115 formed of rubber, synthetic resin or the like.

The connecting ring 116 is rotatably fitted around the outer peripheral surface of the connecting flange 121. The ring 116 has an L-shape in section so as to oppose the side face of the flange 121 on the portion 75a side leaving therebetween a predetermined clearance. The ring 116 is secured to the central wall 8b by means of a plurality of bolts 117 (only one of which is shown). The resilient frictional member 115 is arranged in the clearance with a predetermined set load. In this way, the connecting flange 121, the connecting ring 116 and the resilient frictional member 115 constitute a transmission torque limiter 118.

The bolts 117 are inserted into bolt holes 119 formed extending through the wall 8b and reinforcing rib 8d raised from the right side of the wall 8b, from the right openings of the holes, that is, from the side opposite to the connecting ring 116. The bolts 117 are screwed into tapped holes 120 of the connecting ring 116.

In this embodiment, when the vehicle is running, the rotation of the front wheel 2f is transmitted to the input member 75 of the gear unit 45 through the connecting ring 116, the resilient frictional member 115 and the connecting flange 121 from the hub 8. Then, the flywheel 72 is driven at a high speed through the gear unit. When the flywheel 72 is being driven, if an overload is about to be applied to the sensor 21 for some reason, either one of the three elements, the connecting ring 116, the resilient frictional member 115 and the connecting flange 121, slips to restrict the transmission torque from the hub 8 to the input member 75 to a valve smaller than a predetermined level. As a result, the action of the overload on the sensor 21 can be prevented. Accordingly, the provision of the aforesaid transmission torque limiter 118 enables the allowable strength of the sensor 21 and devices controlled by the sensor 21 to be lowered, thereby to reduce the weight thereof.

The input member 75 and the ring gear 76, which are formed separately from each other, can be formed from respective materials which are suitable for their function, to thereby provide a lightweight and highly durable gear unit 45.

Since the input member 75 is connected to one side surface of the vertical partition wall 8b within the hub 8, locating and fixing of the input member 75 in its position is reliably accomplished to always maintain a proper transmission posture.

Since for connection of the input member 75 to the wall 8b, the bolt 117 is inserted, from the side opposite to the input member 75, into the bolt hole 119 extending through the wall 8b, the bolt 117 can be mounted and removed without being impaired by the gear unit 45 and the sensor 21. It is therefore possible to easily mount and remove the input member 75.

Figure 9:
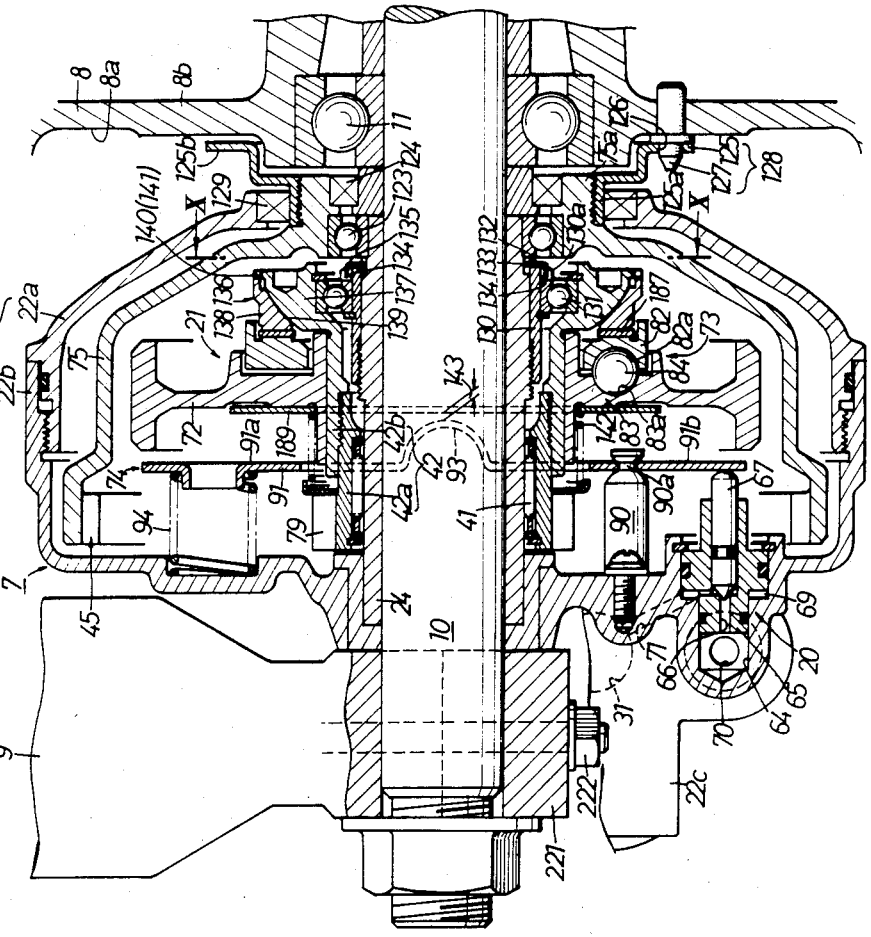
FIGS. 9 to 11 show a third embodiment, FIG. 9 an enlarged longitudinal sectional view showing the essential parts, FIG. 10 a sectional view taken on line X—X of FIG. 9, and FIG. 11 a sectional view showing essential parts.
Figure 10:
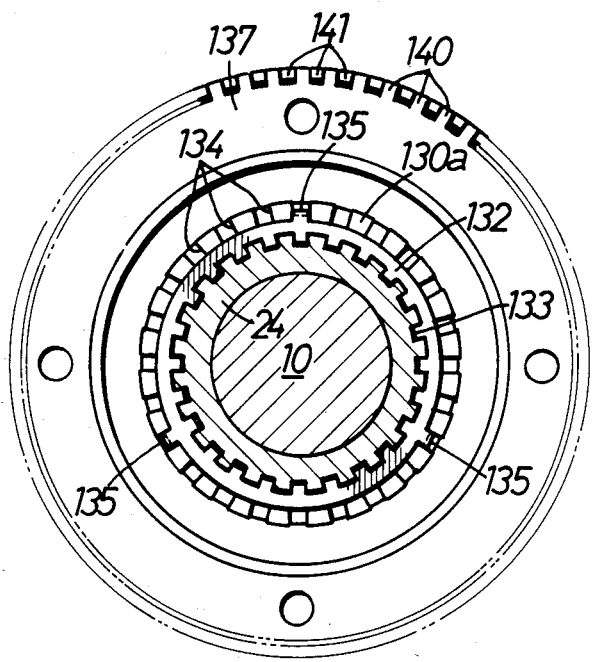
Figure 11:
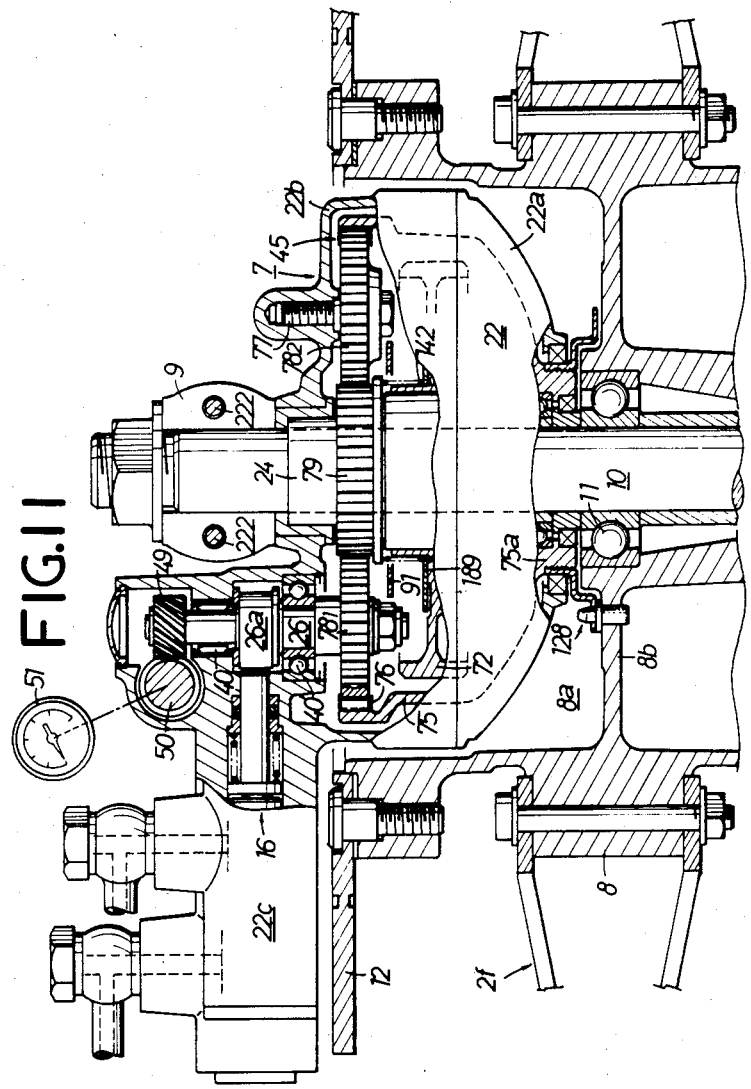

FIGS. 9 to 11 show a third embodiment of the present invention.

The axle 10 is detachably fixed at both ends thereof to the lower end of a pair of right and left front forks 9, 9 (only the left fork of which is shown) by means of a holder 221 and a bolt and nut 222. The outer casing 22b of the casing 22 is supported at a central portion of end wall thereof on the shaft 24 adjacent to and inwardly of the left front fork 9.

The input member 75 is integrally formed at a central portion of its end wall with a cylindrical boss portion 75a projecting externally of the member 75. This portion 75a is rotatably supported on the shaft 24 through a bearing 123 and a sealing member 124.

A boss 125a of a coupling plate 125 is screwed into the outer peripheral portion of the portion 75a. The coupling plate 125 has a flange 125b which is bent and extended radially and outwardly from the outer end of the boss 125a. The flange 125b is bored with a plurality of engaging holes 126 on the circumference thereof. On the other hand, a plurality of coupling pins 127 formed of synthetic resin are provided and implanted corresponding to the plurality of engaging holes 126 on the wall 8b of the hub 8 of the wheel 2f opposed to the flange 125b. When the cylindrical shaft 24 is fitted to the axle 10, the coupling pins 127 and the engaging holes 126 of the coupling plate 125 are mated with each other to connect the hub 8 to the input member 75. In this way, the coupling plate 125 and the coupling pins 127 constitute a coupling 128.

The coupling pins 127 are formed into a converged shape so as to be smoothly fitted into the engaging holes 126. The coupling pins 127 also function as shear pins which are capable of being sheared upon receipt of rotary torque above a set value.

The boss 125a of the coupling plate 125 extends through the inner casing 22a of the casing 22, and a sealing member 129 for sealing the interior of the casing 22 from outside is imposed therebetween. The provision of the sealing member 129 on such small diameter portion of the plate 125 minimizes a slipping speed of a lip portion of the sealing member 129 to effectively prolong a service life thereof.

The drive shaft 42 is composed of an inner shaft 42a integral with the sun gear 79, and an outer shaft 42b which is screwed into the outer peripheral portion of the inner shaft 42a and extends in a direction opposite the sun gear 79, that is, in a direction toward the end wall of the input member 75. The inner shaft 42a is rotatably supported on the shaft 24 through a needle bearing 41, and the outer shaft 42b is rotatably supported through a ball bearing 131 on an adjusting threaded cylinder 130 screwed onto the outer peripheral portion of the shaft 24.

When the cylinder 130 is threadedly advanced to and retracted from the shaft 24, the axial position of the drive shaft 42 with respect to the shaft 24 can be adjusted through the ball bearing 131. A locking ring 132 is provided between the cylinder 130 and the shaft 24 to lock the cylinder 130 after adjustment. The locking ring 132 is slidably spline-connected at 133 to the outer peripheral portion of the shaft 24 and is provided on the outer peripheral portion thereof with one or more locking pawls 135 which are engageable with one or more locking grooves 134 provided at an end flange 130a of the cylinder 130. In the assembled state of the antilock controller 7, the locking pawl 135 is restricted by the ball bearing 131 to assume a locked position where the locking pawl 135 is engaged with the locking groove 134.

The outer shaft 42b of the drive shaft 42 rotatably supports the flywheel 72. The outer shaft 42b is connected to the flywheel 72 through a centering device 136, a friction clutch plate 187 and a cam mechanism 73.

The centering device 136 is composed of a thrust bearing portion 137 formed at a tip of the outer shaft 42b on the side of the end wall of the input member 75, and a centering member 138 in contact with the thrust bearing portion 137 at a spherical surface 139 having a center on an axis of the axle 10. The thrust bearing portion 137 and the centering member 138 are respectively provided with transmission pawls 140 and 141 which engage each other to transmit rotary torque from one to the other.

The cam mechanism 73 is composed of a drive cam plate 82 in contact with the centering member 138 through the friction clutch plate 187, a driven cam plate 83 formed integral with the flywheel 72 and opposing to the drive cam plate 82, and a plurality of thrust balls 84 (only one of which is shown) engageable with cam recesses 82a, 83a of both the cam plates 82, 83. The function of the cam mechanism 73 is not further described since it has the same function as that of the aforementioned first and second embodiments.

The friction clutch plate 187 and the drive plate 82 can always be maintained in a proper attitude by the centering action of the centering member 138.

A pressing plate 189 is superimposed on the end face of the flywheel 72, said end face being opposed to the cam mechanism 73. This pressing plate 189 is biased by means of a set spring 142 toward the thrust bearing portion 137. Thereby, an approaching force is applied to both the cam plates 82 and 83 to press these plates toward each other. Further force is applied to the drive cam plate 82, the clutch plate 187, the centering member 138 and the thrust bearing portion 137, so as to strengthen their mutual engagement.

A play, as in the aforementioned embodiments, is not provided in the output lever mechanism 74 between the lever 91 and the neck 90a of the supporting shaft 90. Instead, a predetermined small clearance 143 is provided between the contact portion 93 of the lever 91 and the pressing plate 189 to ensure the closing of the valve 20. The small clearance 143 is adjusted to a proper value by adjusting the relative position of the drive shaft 42 to the shaft 24 by means of the adjusting threaded cylinder 130 as previously mentioned.

Next, the assembling step of this embodiment will be described. In assembling the antilock controller 7 to the wheel 2f, one axial end of the shaft 24 is fitted to the outer casing 22b accommodating the pump 16, the modulator 17, the valve 20 and the lever mechanism 74. The planetary gears 78₁, 78₂ of the gear unit 45, the drive shaft 42, the flywheel 72, the cam mechanism 73, the centering device 136 and the like are installed on the shaft 24. Thereafter, the input member 75 of the gear unit 45 is fitted on the other axial end of the shaft 24. Then, the inner casing 22a is screwed into the outer casing 22b and thereafter the coupling plate 125 of the coupling 128 is screwed into the cylindrical portion 75a of the input member 75. In this way, the antilock controller 7 is assembled as a single assembly separately from the wheel 2f.

Subsequently, the shaft 24 of the antilock controller 7 is fitted to the axle 10 supporting the hub 8 of the wheel 2f, and the controller 7 is encased in the recess 8a of the hub 8. Then, the engaging holes 126 of the coupling plate 125 and the pins 127 of the hub 8 immediately engage one another.

Thereafter, both axial ends of the axle 10 are securely fixed to the lower ends of the pair of front forks 9, 9 by means of the holder 221 and the bolt and nut 222.

In this manner, assembling of the anti-lock controller 7 and its installation to the wheel 2f are easily accomplished. The axle 10 firmly supports the casing 22 and the hub 8 neatly encases the main parts of the antilock controller 7.

In this embodiment, when an overload is applied to the input member 75 for some reason during driving of the flywheel, the coupling pins 127 of the coupling 128 are sheared to interrupt the transmission of a turning force from the hub 8 to the input member 75. Thus, it is possible to prevent the overload from acting on the gear unit 45 and the sensor 21.

When after axial displacement of the flywheel 72, the rotary torque due to inertia of the flywheel 72 exceeds a set transmission torque of the friction clutch plate 187, a slip occurs between the centering member 138 and the drive cam plate 82 and as a result, the flywheel 72 continues its overrunning rotation with respect to the drive shaft 42 thus making it possible to interrupt transmission of overload to the cam mechanism 73 and the like.

As described above, according to the third embodiment, one side wall of the casing 22 encasing the antilock controller 7 is supported on one axial end of the shaft 24 fitted on the axle 10 supporting the wheel, and the input member 75 of the gear unit 45 extending through the other side wall of the casing 22 is rotatably supported on the other axial end of the shaft 24. The coupling 128, which assumes the connected state when the shaft 24 is fitted on the axle 10, is provided between the input member 75 and the wheel. Therefore, the axle 10 is further effectively utilized to support the casing 22, thus simplifying the supporting construction of the casing 22 and providing a lightweight and small-sized device. Moreover all the elements of the antilock controller 7 including the gear unit 45 can be encased in the casing 22 to be formed in a single independent assembly. Accordingly, the assembling and disassembling properties as well as maintenance of the antilock controller 7 can be enhanced. In addition, the gear unit 45 can be connected with the wheel simultaneously with the attachment of the antilock controller 7 to the axle 10 to further enhance the assembling properties as a whole.

Moreover, the coupling 128 is sheared when an overload is applied to the input member 75 to prevent the overload from acting on the gear unit 45 and the sensor 21. Therefore, the brake device can be operated more accurately.

Figure 12:
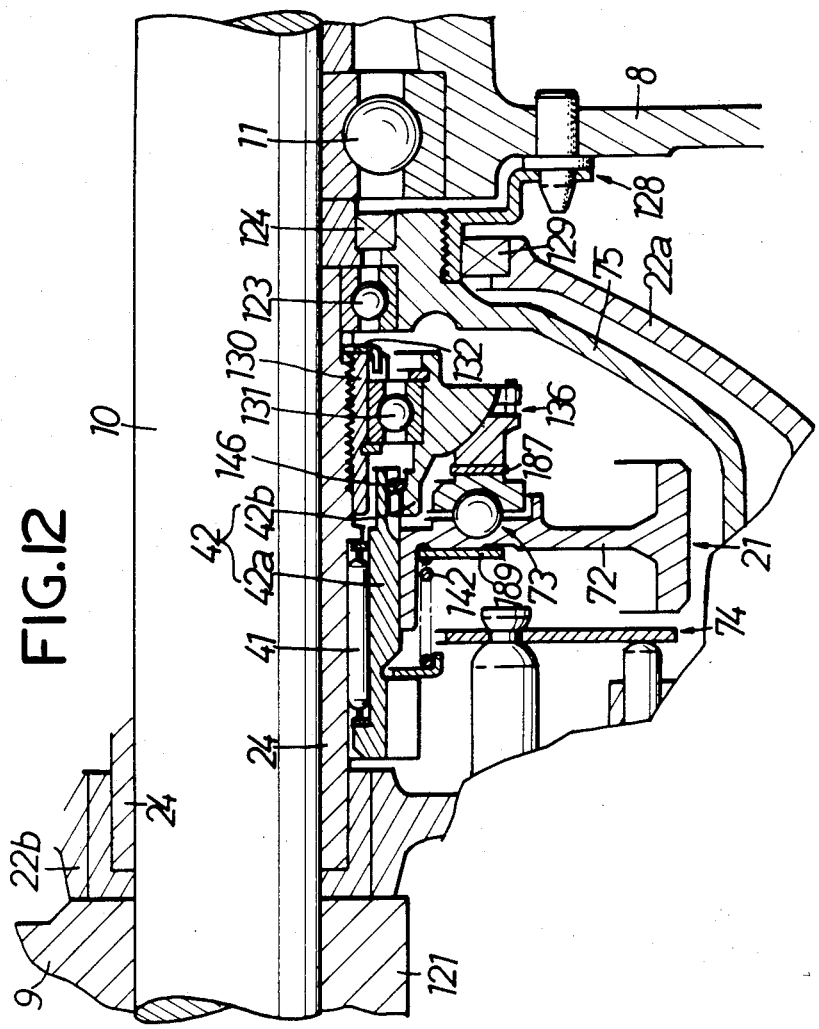

FIG. 12 shows a fourth embodiment of the present invention, which is substantially similar to the aforementioned third embodiment in the structure except that the inner shaft 42a and outer shaft 42b which constitute the drive shaft 42 are spline-fitted to each other, and a resilient stop ring 146 is retained to the end of the outer shaft 42b on the inner shaft side to prevent their disengagement.

FIG. 13 shows a fifth embodiment of the present invention, which is substantially similar to the aforementioned third embodiment except that the drive shaft 42 is formed of a single member, that a friction clutch plate 187 is directly pressed against a thrust bearing portion 137 while eliminating the centering device 136 shown in the third embodiment, that the drive cam plate 82 is rotatably supported on the output shaft 42, and that the flywheel 72 is rotatably supported on the drive cam plate 82 for the purpose of simplifying the construction of the device.

What is claimed is:

1. An antilock brake device for a vehicle having a wheel with a hub rotatably mounted to the vehicle and a hydraulic brake system for the vehicle, comprising
a deceleration sensor including a flywheel rotatably mounted to the vehicle;
a hydraulic modulator casing fixed on the vehicle;
a pump hydraulically coupled with the hydraulic brake system having a pump shaft rotatably mounted in said hydraulic modulator casing; and
an accelerating gear unit having an input member fixed to the hub, a ring gear on said input member, a planetary gear fixed on said pump shaft and meshed with said ring gear and a sun gear operatively coupled with said flywheel and meshed with said planetary gear.

2. The antilock brake device of claim 1 wherein said input member is annularly disposed about said flywheel with said ring gear, planetary gear and sun gear being on one side of said flywheel and said input member being fixed to the hub on the other side of said flywheel.

3. The antilock brake device of claim 2 wherein said deceleration sensor is between the attachment of said input member to the hub and said ring gear, planetary gear and sun gear.

4. The antilock brake device of claim 2 wherein said casing is on the other side of said planetary gear from said flywheel and said deceleration sensor further includes a lever mechanism coupled with said flywheel to indicate wheel deceleration and having an output lever, a fulcrum fixed to said casing, a spring on said casing and a valve member on said casing, said output level being between said flywheel and said planetary gear, said fulcrum, said spring and said valve member extending from said casing to said output lever.

5. The antilock brake device of claim 2 wherein said casing includes a cover extending inwardly toward the hub about said input member to seal with said input member adjacent the attachment of said input member to the hub.

6. The antilock brake device of claim 1 further comprising a drive shaft coupled with said flywheel, said sun gear being fixed to said drive shaft.

7. The antilock brake device of claim 1 further comprising a cylindrical shaft extending from said casing to the hub, said sun gear, said flywheel and said input member being rotatably mounted around said cylindrical shaft.

8. The antilock brake device of claim 1 wherein said input member is cup-shaped with an annular portion and an end wall portion, said ring gear being fixed to said annular portion and said input member being fixed at said wall portion to the hub.

9. The antilock brake device of claim 1 wherein said input member includes a torque limiter, said input member being fixed to the hub through said torque limiter to slip when subjected to torque in excess of a predetermined value.

10. An antilock brake device for a vehicle having a wheel and a hydraulic brake system for the vehicle, comprising
an axle for the wheel fixed to the vehicle;
a hub rotatably mounted on said axle and supporting the wheel, said hub including a partition wall extending outwardly from about said axle and a recess about said axle to one side of said partition wall;
a deceleration sensor having a flywheel rotatably mounted about said axle;
an accelerating gear unit having an input member fixed to said partition wall, and a gear train coupling said input member to said flywheel; and
bolts extending through said partition wall to fix said input member to said partition wall.

11. The antilock brake device of claim 10 wherein said hub further includes a boss extending about axle into said recess from said partition wall, said input member being retained on said boss.

12. The antilock brake device of claim 10 wherein said input member includes a torque limiter, said input member being fixed to said hub through said torque limiter to slip when subjected to torque in excess of a predetermined value.

13. An antilock brake device for a vehicle having an axle, a wheel with a hub rotatably mounted to the axle and a hydraulic brake system for the wheel, comprising
a deceleration sensor having a flywheel rotatably mounted about the axle; and
an acclerating gear unit having an annular input member fixed to rotate with the hub about the axle, and a gear train coupling said input member to said flywheel, said flywheel being between said gear train and the hub along the axle.

14. The antilock brake device of claim 13 further comprising a hydraulic modulator casing fixed on the vehicle on the other side of said gear train from said flywheel, said deceleration sensor further including a lever mechanism coupled with said flywheel to indicate wheel decelerating and having an output lever, a fulcrum fixed to said casing, a spring on said casing and a valve member on said casing, said output lever being between said flywheel and said gear train, said fulcrum, said spring and said valve member extending from said casing to said output lever.

15. The antilock brake device of claim 13 further comprising a drive shaft about the axle coupled with said flywheel and coupled with said gear train.

16. The antilock brake device of claim 15 further comprising a cylindrical shaft about the axle, said drive shaft, said flywheel and said input member being rotatably mounted about said cylindrical shaft.

17. The antilock brake device of claim 13 wherein said input member includes a torque limiter, said input member being fixed to the hub through said torque limiter to slip when subjected to torque in excess of a predetermined value.

18. The antilock brake device of claim 13 wherein said gear train includes a ring gear on said input member, a planetary gear meshed with said ring gear and a sun gear operatively coupled with said flywheel and meshed with said planetary gear, said input member being cup-shaped with an annular portion and an end wall portion, said ring gear being fixed to said annular portion and said input member being fixed at said wall portion to the hub.

19. The antilock brake device of claim 18 wherein said input member includes a cylindrical portion centered in said wall portion and mating with the hub.

20. The antilock brake device of claim 18 wherein said ring gear is formed of a harder material than said input member.

21. The antilock brake device of claim 13 wherein said input member includes a torque limiter, said torque limiter having a first member connected to the hub for rotation therewith and a second member connected to said input member to rotate therewith, said first and second members being placed in contact with each other under sufficient axial compression to slip when subjected to torque in excess of a predetermined level.

22. An antilock brake device for a vehicle having a wheel and a hydraulic brake system for the wheel, comprising
   a hub rotatably mounted on the vehicle about an axis and supporting the wheel, said hub having a partition wall extending outwardly about the axis and a recess about the axis on one side of said partition wall;
   a deceleration sensor having a flywheel rotatably mounted about the axis in said recess;
   a transmission in said recess operatively coupled with said flywheel and including an input member rotatably mounted in said recess about the axis, said input member having a coupling plate extending to adjacent said partition wall of said hub, one of said partition wall and said coupling plate having engaging holes and the other of said partition wall and said coupling plate having sheer pins extending into said engaging holes.

23. The antilock brake device of claim 22 wherein said pins are formed with a reduced distal end for facilitating assembly with said engaging holes.

24. The antilock brake device of claim 22 wherein said pins are located in said partition wall.

25. The antilock brake device of claim 22 wherein said pins are formed of synthetic resin.

26. An antilock brake device for a vehicle having an axle, a wheel with a hub rotatably mounted to the axle and a hydraulic brake system for the wheel, comprising
   a cylindrical shaft about the axle;
   a deceleration sensor having a drive shaft rotatably mounted about said cylindrical shaft and a flywheel rotatably mounted about said drive shaft;
   an accelerating gear unit having an annular input member fixed to rotate with the hub and a gear train coupling said input member to said drive shaft;
   a bearing supporting said drive shaft on said cylindrical shaft; and
   a cylinder adjustably fixed on said cylindrical shaft, said bearing for said drive shaft being fixed about its inner periphery to said cylinder and being fixed about its outer periphery to said drive shaft.

27. The antilock brake device of claim 26 further comprising a locking ring provided between the cylinder and the cylindrical shaft to retain the relative position of said cylinder to said cylindrical shaft, said cylinder being threaded on said cylindrical shaft.

28. The antilock brake device of claim 26 further comprising a cam drive coupling between said drive shaft and said flywheel to one side of said flywheel to restrict movement of said flywheel in one direction along the axle and a bias spring extending to the other side of said flywheel to resist movement along the axle in the other direction.

29. The antilock brake device of claim 28 wherein said drive shaft includes a stop to retain said bias spring in compression against said flywheel.

30. The antilock brake device of claim 29 wherein said deceleration sensor further includes a lever mechanism coupled with said flywheel to indicate wheel deceleration and having an output lever, a fulcrum extending to said lever and about which said lever pivots, a spring extending to said lever to resist pivotal movement of said lever about said fulcrum and a valve member extending to said lever to be actuated by pivotal movement of said lever.

31. The antilock brake device of claim 30 wherein said lever is spaced a predetermined distance established by adjustment of said cylinder on said cylindrical shaft from engagement with said flywheel prior to actuation of said cam drive coupling resulting from locking conditions.

32. The antilock brake device of claim 26 wherein said flywheel is between said accelerating gear unit and the hub along the axle and said input member extends from between said flywheel and the hub along the axle annularly about said flywheel to said accelerating gear unit.

33. The antilock brake device of claim 26 further comprising a centering device between said drive shaft and said flywheel, said centering device including a spherical surface coupled with said drive shaft and having a center of said surface being coincident with the centerline of the axle and a centering member having a surface mating with said spherical surface, said centering member being operatively connected to the flywheel.

34. The antilock brake device of claim 33 wherein said spherical surface and said surface on said centering member include pawls for interlocking to prevent relative rotation therebetween about the axle.

35. An antilock brake device for a vehicle having an axle, a wheel with a hub rotatably mounted to the axle and a hydraulic brake system for the vehicle, comprising
   a cylindrical shaft about the axle;
   a deceleration sensor having a drive shaft rotatably mounted about said cylindrical shaft and a flywheel rotatably mounted about said drive shaft;
   an accelerating gear unit having an annular input member fixed to rotate with the hub and a gear train coupling said input member to said drive shaft; and
   a centering device between said drive shaft and said flywheel, said centering device including a spherical surface coupled with said drive shaft and having a center of said surface being coincident with the centerline of the axle and a centering member having a surface mating with said spherical surface, said centering member being operatively coupled to the flywheel.

36. The antilock brake device of claim 35 wherein said spherical surface and said surface on said centering member include pawls for interlocking to prevent relative rotation therebetween about the axle.

37. The antilock brake device of claim 35 wherein said gear train includes a ring gear on said input member, a planetary gear meshed with said ring gear, and a sun gear fixed to said drive shaft and meshed with said planetary gear, said gear train being on one side of said flywheel and said input member being fixed to the hub on the other side of said flywheel.

38. The antilock brake device of claim 35 wherein said input member includes a torque limiter, said input member being fixed to the hub through said torque limiter to slip when subjected to torque in excess of a predetermined value.

39. The antilock brake device of claim 35 further comprising a hydraulic modulator casing fixed on the vehicle on the other side of said gear train from said flywheel, said deceleration sensor further including a lever mechanism coupled with said flywheel to indicate wheel deceleration and having an output lever, a fulcrum fixed to said casing, a spring on said casing and a valve member on said casing, said output lever being between said flywheel and said gear train, said fulcrum, said spring and said valve member extending from said casing to said output lever.

40. The antilock brake device of claim 35 wherein said centering device is on the other side of said flywheel from said gear train.

* * * * *